(12) United States Patent
Bourilkov et al.

(10) Patent No.: US 7,038,333 B2
(45) Date of Patent: May 2, 2006

(54) HYBRID POWER SUPPLY

(75) Inventors: Jordan T. Bourilkov, Stamford, CT (US); David N. Klein, Southbury, CT (US); John Rotondo, Shelton, CT (US)

(73) Assignee: The Gillette Company, Boston, MA (US)

( * ) Notice: Subject to any disclaimer, the term of this patent is extended or adjusted under 35 U.S.C. 154(b) by 387 days.

(21) Appl. No.: 10/077,191

(22) Filed: Feb. 15, 2002

(65) Prior Publication Data

US 2003/0155887 A1  Aug. 21, 2003

(51) Int. Cl.
*H02J 1/16* (2006.01)

(52) U.S. Cl. .................. 307/46; 307/45; 363/142; 320/162

(58) Field of Classification Search .......... 320/140, 320/103, 134, 152, 164, 139, 136, 104, 127, 320/135, 137, 132, 133, 119, 162, 125; 363/15, 363/13, 89, 124, 21.4, 142; 323/270, 273, 323/282, 268, 299, 266, 222, 272; 307/46, 307/43, 44, 45, 87
See application file for complete search history.

(56) References Cited

U.S. PATENT DOCUMENTS

| | | | |
|---|---|---|---|
| 979,154 A | 12/1910 | Gugler | 320/103 |
| 979,155 A | 12/1910 | Gugler | 320/103 |
| 2,530,587 A | 11/1950 | Sorensen | 307/150 |
| 2,818,543 A | 12/1957 | Dodge | 320/103 |
| 3,414,793 A | 12/1968 | Jasperson | 320/103 |
| 3,607,403 A | 9/1971 | Arrance | 429/9 |
| 3,629,680 A | 12/1971 | Baynes et al. | 320/2 |
| 3,912,998 A | 10/1975 | Harris | 320/2 |
| 3,959,706 A | 5/1976 | Mabuchi et al. | 320/2 |
| 4,009,051 A | 2/1977 | Kazis et al. | 320/15 |
| 4,178,538 A | 12/1979 | Kelly, III | 320/2 |
| 4,186,335 A | 1/1980 | Cahill | 320/3 |
| 4,282,474 A | 8/1981 | Wyzenbeek | 320/2 |
| 4,311,952 A | 1/1982 | Mabuchi et al. | 320/3 |
| 4,563,626 A | 1/1986 | Ohtake | 320/2 |
| 4,670,700 A | 6/1987 | Henkel | 320/2 |
| 4,692,680 A | 9/1987 | Sherer | 320/2 |
| 5,206,576 A | 4/1993 | Jasinski | 320/2 |
| 5,309,082 A * | 5/1994 | Payne | 323/270 |
| 5,407,444 A | 4/1995 | Kroll | 607/5 |
| 5,568,038 A | 10/1996 | Tatsumi | 320/14 |
| 5,610,450 A * | 3/1997 | Saeki et al. | 307/46 |

(Continued)

FOREIGN PATENT DOCUMENTS

DE  35 25 630 A1  1/1987

(Continued)

OTHER PUBLICATIONS

"Zinc Air Hybrid Battery", Duracell, Sep. 1989, p. 12.

*Primary Examiner*—Rajnikant B. Patel
(74) *Attorney, Agent, or Firm*—Fish & Richardson P.C.

(57) ABSTRACT

A hybrid power supply includes a switching type DC/DC boost type converter that receives energy from a primary battery cell and is arranged to deliver the energy to a rechargeable cell, set to provide a fixed output voltage that is less than the full charge voltage of the rechargeable cell. The hybrid power supply includes a circuit including a primary battery current control that senses primary battery current, and controls in part operation of the converter to provide constant current discharge on the primary battery side of the hybrid power supply.

26 Claims, 3 Drawing Sheets

U.S. PATENT DOCUMENTS

| | | | | |
|---|---|---|---|---|
| 5,631,503 A | 5/1997 | Cioffi | | 307/66 |
| 5,646,501 A * | 7/1997 | Fishman et al. | | 320/112 |
| 5,668,463 A | 9/1997 | Duley | | 320/15 |
| 5,677,614 A | 10/1997 | Ohmori et al. | | 320/32 |
| 5,686,809 A | 11/1997 | Kimura et al. | | 320/2 |
| 5,686,813 A | 11/1997 | Huen et al. | | 320/5 |
| 5,717,308 A | 2/1998 | Nishitani et al. | | 320/6 |
| 5,811,958 A | 9/1998 | Yamamoto | | 320/101 |
| 5,900,720 A | 5/1999 | Kallman et al. | | 328/167 |
| 5,986,437 A * | 11/1999 | Lee | | 320/162 |
| 5,993,983 A | 11/1999 | Rozon | | 429/9 |
| 5,998,052 A | 12/1999 | Yamin | | 429/9 |
| 6,094,034 A * | 7/2000 | Matsuura | | 320/134 |
| 6,130,518 A | 10/2000 | Gabehart et al. | | 320/103 |
| 6,154,007 A | 11/2000 | Shaver et al. | | |
| 6,181,100 B1 | 1/2001 | Shoji | | 320/103 |
| 6,255,008 B1 * | 7/2001 | Iwase | | 429/9 |
| 6,262,559 B1 | 7/2001 | Eggert et al. | | 320/103 |
| 6,262,560 B1 | 7/2001 | Lionberg et al. | | 320/103 |
| 6,288,518 B1 | 9/2001 | Yang et al. | | 320/103 |
| 6,331,365 B1 * | 12/2001 | King | | 429/9 |
| 6,517,972 B1 * | 2/2003 | Amatucci | | 429/231.1 |

FOREIGN PATENT DOCUMENTS

| | | |
|---|---|---|
| JP | 55-141074 | 11/1980 |
| JP | 57-72278 | 5/1982 |
| JP | 60-223441 | 11/1985 |
| JP | 03-060337 | 3/1991 |
| JP | 06-078465 | 3/1994 |
| JP | 09-113950 | 5/1997 |
| JP | 10-031244 | 2/1998 |
| JP | 11298342 A * | 10/1999 |

* cited by examiner

HYBRID POWER SUPPLY

BACKGROUND

This invention relates to powering of portable electronic devices.

Portable electronic devices are normally powered with either a primary or a rechargeable battery. Growth in the portable electronic device market, as well as, changes in usage patterns, has provided opportunities for the integration of both primary and rechargeable sources of power to power an electronic device. While primary batteries have a greater energy density, their internal resistance is larger, and primary batteries are less suitable in high drain (>0.2 C rate of discharge) electronic devices. Rechargeable batteries can handle large loads but do not have sufficient energy capacity for many applications.

SUMMARY

According to an aspect of the invention, a hybrid power supply includes a switching type DC/DC boost type converter that receives energy from a primary battery cell and is arranged to deliver the energy to a rechargeable cell, set to provide a fixed output voltage that is less than the full charge voltage of the rechargeable cell.

According to an additional aspect of the invention, a hybrid power supply includes a switching type DC/DC boost type converter that receives energy from a primary cell and is arranged to deliver the energy to a rechargeable cell and a circuit disposed to control the switching type DC/DC converter. The circuit includes a resistor voltage divider coupled to the feedback input of the converter, selected to provide a fixed output voltage that is less than the full charge voltage of the rechargeable cell.

According to an additional aspect of the invention, a method of operating a hybrid power supply includes delivering energy from a primary cell to a rechargeable cell through a switching type DC/DC boost type converter at a fixed voltage that is less than the full charge voltage of the rechargeable cell.

One or more aspects of the invention may include one or more of the following advantages.

The circuit can take advantage of charging voltage characteristics of Li– ion or Li– polymer rechargeable batteries. For example, the charge voltage of Li– ion batteries is conveniently related to their state of charge over a wide range. This allows the circuit to produce an output voltage from the DC/DC converter 12 at a level that corresponds to a desired state of charge. The circuit does not fully charge the rechargeable battery, sacrificing a percentage of the maximum continuous runtime of the device. But, the non-fully charged arrangement provides the following advantages. The circuit provides a higher energy efficiency of the rechargeable battery. At the end of charge of a rechargeable battery heat losses are produced. By avoiding maximum charge such losses are avoided. Also the rechargeable battery has a lower self-discharge rate (because of a lower charging voltage). In addition, there is minimization in damage from long-term storage. If the rechargeable battery is stored at full charge, the Li– ion battery will permanently lose part of its capacity. Also the circuit minimizes the need for a charge controller and protection circuit.

The circuit also loosens accuracy requirements for the DC/DC converter circuit. Li– ion chargers have typically better than 0.5% accuracy in the output voltage. This typically requires a second charging device after the DC/DC converter. Without fully charging the Li– ion cell allows for a +/– voltage tolerance allowing use of simple and inexpensive DC/DC converters. The circuit allows for a narrow voltage range at the device power supply terminal (which makes the device internal voltage regulation more efficient). The circuit automatically compensates for the amount of energy used from the rechargeable battery and provides a circuit having a very low quiescent current characteristic. The circuit efficiently uses the primary battery energy, has low EMI levels and can be integrated into existing Li– ion powered devices The details of one or more embodiments of the invention are set forth in the accompanying drawings and the description below. Other features, objects, and advantages of the invention will be apparent from the description and drawings, and from the claims.

DETAILED DESCRIPTION

Figure 1:
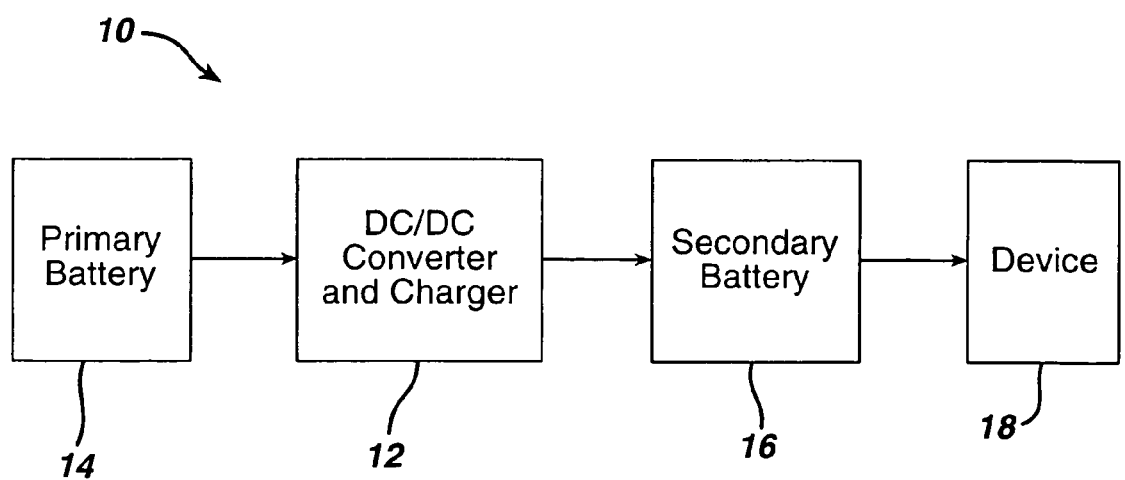
FIG. 1 is a block diagram of a hybrid DC power supply.

Referring to FIG. 1, a hybrid power supply 10 includes a switching type DC/DC boost type converter 12 that receives energy from a primary cell 14 and delivers the energy to a secondary, e.g., rechargeable cell 16. The rechargeable cell 16 delivers power, as needed, to the device 20. The device 20 can be any type of electronic device, especially a portable device such as a wireless device, e.g., a cell phone, personal digital assistant, digital camera, and so forth. The switching type DC/DC boost type converter 12 is configured to provide a fixed output voltage that is less than the charging voltage of the rechargeable cell 16, and is current limited to a portion of the charging current of the rechargeable cell. In this configuration, the switching type DC/DC boost type converter 12 acts also as a charger for the secondary battery. The rechargeable cell 16 can be a rechargeable Li– Ion type. Preferred examples include a Li– Ion or Li– Polymer rechargeable cell. These rechargeable cells can provide power to a device 18 for relatively long periods of time compared to other potential rechargeable cells, and can be effective over long periods of continuous use. Primary power sources 14 may include, but are not limited to alkaline, zinc-air, and fuel cells.

By using Li– ion or Li– polymer rechargeable batteries the circuit 10 can take advantage of charging voltage characteristics of such batteries. For example, the charge voltage of Li– ion batteries is conveniently related to their state of charge over a wide range. This allows the circuit 110 to produce an output voltage from the DC/DC converter 12 at a level that corresponds to a desired state of charge. For example, at a voltage of about 4V, the level is about 90% of the charge voltage. The circuit 10 does not fully charge the rechargeable battery 16, sacrificing 10% of the maximum continuous runtime of the device 20. But the non-fully charged arrangement provides the following advantages. The circuit 10 provides a higher energy efficiency of the rechargeable battery 16. At the end of charge of a rechargeable battery 16 heat losses are produced. By avoiding maximum charge such losses are avoided. Also the rechargeable battery 16 has a lower self-discharge rate (because of a lower charging voltage). In addition, there is minimization in damage from long-term storage. If the rechargeable battery 16 is stored at full charge, the Li– ion battery will permanently lose part of its capacity. Also the circuit 10 minimizes the need for a charge controller and protection circuit.

The circuit 10 also loosens accuracy requirements for the DC/DC converter circuit 12. Li– ion chargers have typically better than 0.5% accuracy in the output voltage. This typically requires a second charging device after the DC/DC converter. Without fully charging the Li– ion cell allows for a +/–2.5% voltage tolerance, from 3.9 to 4.1V, which is the output voltage accuracy typical of simple and inexpensive DC/DC converters. The circuit 12 eliminates potential to overcharge the Li– ion battery, resulting in a simplified protection circuit (not shown). The circuit 10 allows for a narrow voltage range at the device power supply terminal (which makes the device internal voltage regulation more efficient). The circuit 10 automatically compensates for the amount of energy used from the rechargeable battery 16 and provides a circuit having a very low quiescent current characteristic. The circuit 10 efficiently uses the primary battery energy, has low EMI levels and can be integrated into existing Li– ion powered devices.

A charge requirement for Li– ion cells is to limit the charge current. The converter itself could limit the charge current. In this way, the step-up voltage converter acts also as a charger to the Li+ battery, acting as a constant current source until the rechargeable battery voltage levels to the converter output voltage, and as a constant voltage source after this point. After the output voltage is reached, the current will drop exponentially to virtually zero in few hours. The system in this state drains negligibly low quiescent current (tens of uA).

Typical converters control the secondary (charging) current and keep the charging current at a constant level; other converters provide no current control. Constant current on the secondary side results in variable current on the primary battery and increases as the voltage on the primary battery decreases. This is a constant power type of discharge and is least favorable for a primary battery. To avoid this the circuit includes the primary battery current control, which senses the primary battery current, and takes part in the closed feedback loop of the DC/DC converter, to assure a low constant current discharge on the primary side, greatly improving the primary battery efficiency.

One drawback is the initial delay, needed for the Li– ion cell to get enough charge to operate the device, especially after replacing the primary battery. A good solution is to monitor the primary battery voltage in the device (through a fuel gauge, low-battery warning and cutoff) and prevent further discharge of the secondary cell. In this way, when the primary battery is discharged, and the rechargeable battery is still nearly fully charged, the device will prompt the user and eventually cutoff, and after replacing the primary battery will be immediately ready to use. The rechargeable battery can be incorporated into the device and not be available to the user.

Figure 2:
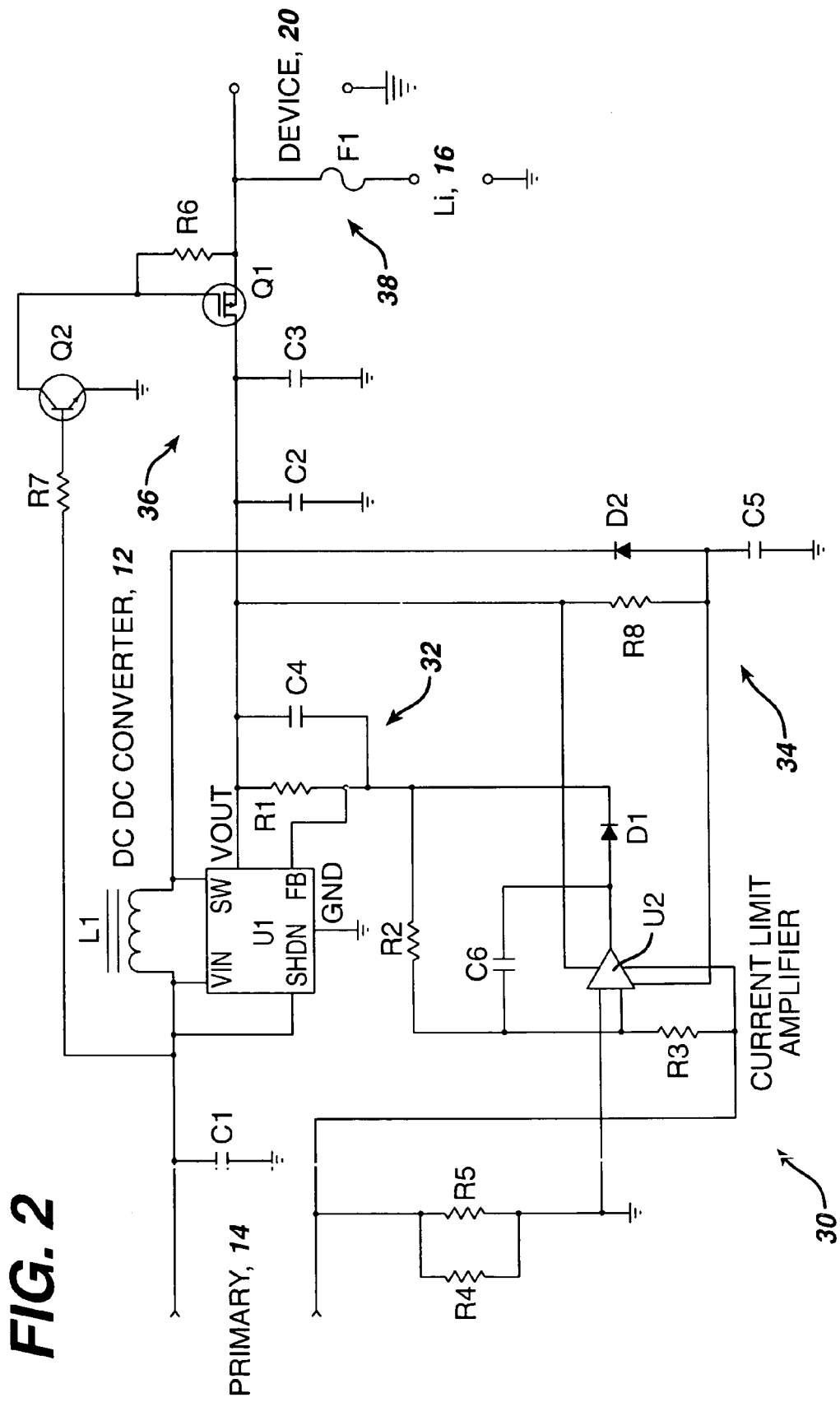
FIG. 2 is a schematic diagram of a control circuit for the hybrid DC power supply.

Referring to FIG. 2, a circuit 30 to control the operation of the step-up (boost) DC/DC converter 12 to provide optimal requirements is shown. The circuit 30 includes bias and control circuits 32 for the DC—DC converter 12, a primary current sense amplifier and a power shutdown 34 and a charge cutoff switch 36. In addition, fuse protection 38 is supplied.

The step-up (boost) DC/DC converter 12 can be for example, an LTC 3400 ($U_1$) from Linear Technology. Many other devices could be used for example, the MAX 1765 from Maxim. The LTC 3400 ($U_1$) has excellent efficiency (>90%) at low current levels, compared to about 80% or less for most other parts. The biasing circuit 32 for the converter 12 includes an inductor $L_1$ (e.g., 6.8 uh) coupled across the converter 12, which is optimized to improve conversion efficiency. The input voltage range of the step-up (boost) DC/DC converter 12 in this example is from 0.7 to 5.5V. The output voltage is adjustable via two external resistors, $R_1$ and $R_2$. The output voltage is adjusted on the feedback input (FB) of the converter 12 to equal an internal voltage reference (e.g., 1.25V), when the output voltage is 4V on output (Vout). The output voltage should remain higher than the input voltage for the converter 12 to operate normally. The limit on output voltage level to 4.0 volts thus limits the input voltage range in this particular implementation to 0.7–3.3V, which is applicable for one or two primary cells in series (alkaline, Zn-air), or one Li primary cell. Should the input voltage exceed the output with more than 0.7V, the body diode within the DC/DC converter chip will be forward biased and current will be transferred from the primary side to the secondary, limited only by the internal resistance of both batteries and the voltage difference between the two systems, resulting in a high inrush current.

The internal output current limit for this converter is 600 mA. A lower current limit, in the range 10–100 mA, is desirable to further improve efficiency and reduce size and cost. Ideally, the circuit 10 could be an ASIC, incorporating most of the external components (probably except the inductor L1 and the current sensing resistor, which can be used to program externally the primary current for the specific application). The capacitors $C_1$, $C_2$ and $C_3$ are used to filter switching pulses at the input and output of the converter 12 and prevent oscillations. C4 is used for "soft start" of the converter and to improve stability.

The circuit 30 has primary current sensor/amplifier with power shutdown section 34 including an operational amplifier U2 having resistors $R_4$ and $R_5$ to provide a primary current sensing resistor. The value of resistors $R_4$ and $R_5$ is a very low value to provide a minimum voltage drop or (IR losses) across the resistor $R_5$ (e.g., 0.25 ohm at 100 mA). The very low (25 mV average) IR drop is amplified 50 times by the operational amplifier $U_2$, whose gain is set by the $R_2/R_3$ ratio to reach 1.25V at the output of a diode $D_1$, connected to the converter 12 feedback input FB. In this way, the output voltage signal across R1, and the input current signal, coming through the diode D1, are summed at the converter's feedback input, without interference in-between, on a "largest-only" basis, and compared to the internal reference voltage. The system reacts to whichever of the signals first reaches 1.25V, and stops the converter switching, thus reducing the output voltage. This provides a simultaneous constant output voltage/constant input current type of battery charging source.

The output voltage is limited to 4V, and the output current is also limited to: $I_{out}=I_{in} \times V_{in}/V_{out}$, which turns this voltage converter into a Li– ion charger, where CV/CC (constant voltage/constant current) output is required. Usually the Li– ion chemistry requires V=4.1V or 4.2V, and I<1 C rate. In circuit 10, V=4V and I<<1 C rate, which is much safer and may not require an additional protection board. If abnormal conditions are anticipated, redundant protections should be used (for example, applying higher voltage at the primary battery terminals may be unsafe for the system described earlier).

As the operational amplifier $U_2$ drains a few tens of microamps, when powered, a power-save shutdown mechanism is implemented in order to reduce the quiescent current of the system, using the shutdown pin of the operational amplifier $U_2$. When the converter 12 is active and switching, the pulses through the diode $D_2$ will decrease the voltage on the shutdown pin of the operational amplifier $U_2$ sufficiently to enable the operational amplifier U2, and when idle, current through the pull-up resistor $R_8$ will charge the capacitor C5 and cut-off power to the operational amplifier U2.

The circuit 30 also includes a switch circuit 36. The Li-ion cell is connected to the output of the DC/DC converter 12 through the MOS FET (metal oxide semiconductor field effect transistor) switch $Q_1$. The switch circuit 36 prevents discharge (several milliamps) of the Li- ion cell through the output of the DC/DC converter 12, when the primary battery during discharge reaches the cutoff voltage on the DC/DC converter 12 input side. The switch circuit 36 could also be used to tune the system primary cutoff voltage to a desired level for one or two cells in series of the selected rechargeable battery chemistry. The charge switch circuit 36 cuts off before the converter 12 input cutoff voltage is reached. The example shown is for "one cell" alkaline implementation. MOSFET Q1 is biased through the emitter-collector junction of the bipolar transistor $Q_2$, and the base-emitter junction of the last is biased through $R_7$ from the primary battery. When the primary voltage drops under about 0.7V, $Q_2$ is off and turns off $Q_1$, stopping the charge. The resistor $R_6$ sinks the leakage current through $Q_2$ when open to prevent it from biasing the high-impedance gate of $Q_2$. As turning the charge "off" removes the load from the converter output Vout and hence from the primary battery, the voltage of the last increases and charging resumes, then the circuit 36 is activated again, thus switching until all available energy of the primary battery for the chosen cutoff voltage is transferred to the rechargeable battery 16. This approach distinguishes from other approaches, as normally a device will cut off when the cutoff voltage of its power source is reached for the first time, and some amount of energy will remain unused in the primary battery. The current approach allows the primary battery to deliver all of its energy prior to termination.

The Li- ion battery has a fuse circuit 38 with fuse ($F_1$) in series with both the charge path and the output, used for safety, to permanently open in case of a short-circuit condition.

There are several parameters to optimize when designing a hybrid power system. For example, the energy of the primary battery 14 is optimized to cover the desired total runtime of the device. The energy of the rechargeable battery 16 is optimized to cover the desired continuous runtime of the device for 1 cycle. The power of the rechargeable cell is selected to be adequate for the device peak power and the charge rate is optimized to allow nearly full primary battery use to satisfy a desired intermittent performance of the device.

This optimization is a compromise between efficiency, charge time, size and price from one side and performance from the other. In order to accelerate the charge, when the rechargeable battery is close to discharged state, a voltage-related charge rate could be implemented in the converter design, as with the MAX 1765 EV board from Maxim. As the Li+ charge voltage rises quickly in the 3V–3.7V region, the high rate charge lasts for a short time only and does not significantly affect the primary battery.

In the unlikely event of emergency use of the device just after the maximum continuous runtime has been used, the full power from the primary battery 14 may be provided to the rechargeable battery 16, at the expense of efficiency.

In many devices 20, a smaller than originally specified size Li- ion battery can provide the necessary peak power, and due to the permanent charging, may be sufficient for satisfactory continuous performance.

Figure 3:
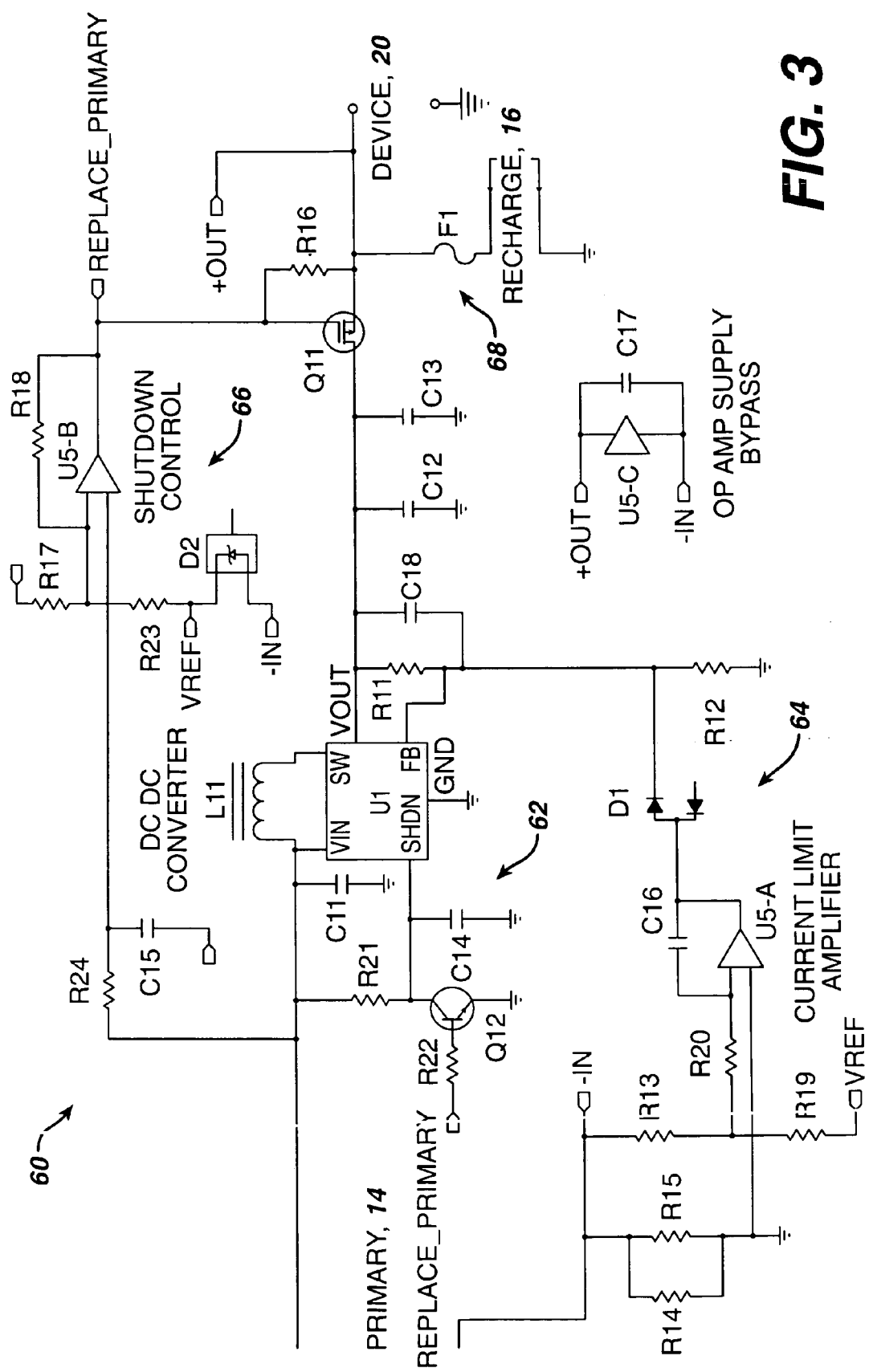
FIG. 3 a schematic diagram of an alternate control circuit for the hybrid DC power supply.

Referring to FIG. 3, an alternative circuit to control the operation of the step-up (boost) DC/DC converter 12 is shown. The circuit includes bias and control circuits for the DC—DC converter 12, a primary current sense comparator 64 and a charge cutoff comparator 66, connected to a power shutdown circuit 62. In addition, fuse protection 68 is supplied.

The step-up (boost) DC/DC converter 12 can be for example, the LTC 3400 ($U_1$) from Linear Technology. Many other devices could be used, for example, the MAX 1765 from Maxim, as mentioned above. The external components for the converter 12 include an inductor $L_{11}$ (e.g., 6.8 uh) coupled across the converter 12, which is selected for optimal conversion efficiency. The input voltage range of the step-up (boost) DC/DC converter 12 in this example is from 0.7 to 5.5V. The output voltage is adjustable via two external resistors, $R_{11}$ and $R_{12}$. The output voltage is adjusted on the feedback input (FB) of the converter 12 to equal an internal voltage reference (e.g., 1.25V), when the output voltage is 4.0V on output (Vout). The output voltage should remain higher than the input voltage for the converter 12 to operate normally. The limit on output voltage level to 4.0 volts thus limits the input voltage range in this particular implementation to 0.7–3.3V, which is applicable for one or two primary cells in series (alkaline, Zn-air), or one Li primary cell. Should the input voltage exceed the output, current will be transferred from the primary side to the secondary, limited only by the internal resistance of both batteries and the voltage difference between the two systems, resulting in a high inrush current.

As above, a lower internal output current limit of the DC/DC converter, in the range 10–100 mA, is desirable to further improve efficiency, and reduce size and cost. This could be provided by an ASIC, incorporating most external components (probably except the inductor L1 and the current sensing resistor, which can be used to program the primary current value for the specific application). The capacitors $C_{11}$, $C_{12}$ and $C_{13}$ are used to filter the switching pulses at the input and output of the converter, and prevent oscillation. The capacitor $C_{18}$ is used to assure "soft start" of the DC/DC converter.

The circuit 64 includes a primary current sensor/comparator, and power shutdown section 62, including an operational amplifier U5-A (one operational amplifier of a dual packaged op amp pair), having resistors $R_{14}$ and $R_{15}$ to provide a primary current sensing resistor, which should have a very low value for minimum voltage drop (or IR losses) across the resistor $R_{15}$ (e.g., 0.25 ohm at 100 mA). The very low (25 mV average) IR drop is compared to a reference voltage (produced by the reference voltage source D2 and the voltage divider $R_{19}/R_{13}$) by the operational amplifier $U_2$, whose output will go high and cut off the converter, when the primary current exceeds the preset limit. The resistor $R_{20}$ and the capacitor $C_{16}$, connected in the negative feedback loop of the operational amplifier U5-A, form an integrator to introduce a delay and thus stabilize the comparator's response. The diode D1 prevents interference between the voltage control and the current control circuits. In this way, the output voltage signal, coming through $R_{11}$, and the input current signal, coming through the diode D1, are summed at the converter's feedback input, without interference in-between, on a "largest-only" basis, and compared to the internal reference voltage. The system reacts to whichever of the signals first reaches 1.25V, and stops the converter 12 switching, thus reducing the output voltage.

The Li– ion cell is connected to the output of the DC/DC converter through the MOS FET (metal oxide semiconductor field effect transistor) switch $Q_{11}$. The shutdown control circuit 66 prevents discharge (several milliamps) of the Li– ion cell through the output of the DC/DC converter 12, when the primary battery during discharge reaches the cutoff voltage on the DC/DC converter input side (in this example 1.4V for two alkaline cells in series). It could also be used to tune the system primary cutoff voltage to a desired level for one or two cells in series of the selected battery chemistry. The shutdown circuit 66 via $Q_{11}$ cuts off before the converter input cutoff voltage is reached. MOSFET $Q_{11}$ is biased through the output of an Op Amp U5-B that is used as a comparator to sense, via resistor $R_{24}$, when the input voltage to the DC—DC converter 12 is below a certain threshold. The threshold voltage is determined by resistors $R_{17}$, $R_{23}$, and Zener diode D2. In this example, a hysteresis is introduced by the use of $R_{18}$ in the U5-B negative feedback loop. If V is 1.40 volts or less, the converter is shut down through the inverter circuit 62, formed by the transistor $Q_{12}$, and the charge is cut off via $Q_{11}$, preventing discharge of the Li– ion cell through the converter output. If V is 1.45 volts or more, the DC/DC converter is "on" and the circuit is charging. A signal "Replace Primary" is asserted when the input voltage is below 1.4V and is used to drive $Q_{11}$ and $Q_{12}$. When the primary voltage drops under about 1.4V, $Q_2$ is off and turns off $U_1$, stopping the charge. The resistor $R_{16}$ sinks the leakage current at the high-impedance gate of $Q_{11}$, when open, to prevent biasing. Turning the charge "off" removes the load from the converter output $V_{out}$ and hence from the primary battery, and the voltage of the primary battery recovers, turning the charge "on" again. The switching and hence charge will continue at attenuated duty cycle until all available energy of the primary battery for the chosen cutoff voltage is transferred, as above.

The Li– ion battery has a fuse circuit 68 with fuse ($F_1$) in series with both the charge path and the output, used for safety, to permanently open in case of a short-circuit condition.

A number of embodiments of the invention have been described, other embodiments are within the scope of the following claims.

What is claimed is:

1. A hybrid power supply comprises:
   a switching type DC/DC boost type converter that receives energy from a primary cell with the primary cell being an alkaline cell, Zn-air cell, fuel cell, solar cell, or another current limited DC power source, and is arranged to deliver the energy to a rechargeable cell with the rechargeable cell being an Li– Ion or Li– Polymer rechargeable cell;
   a circuit disposed to control the switching type DC/DC converter, the circuit comprising:
   a resistor voltage divider coupled a feedback input of the DC/DC converter, the resistor voltage divider having a resistor voltage divider ratio selected to provide a voltage at the feedback input, to control the DC/DC converter to provide an output voltage that is less than the full charge voltage of the rechargeable cell.

2. The hybrid power supply of claim 1, further comprising:
   a primary battery current sensor/comparator, included in a feedback control loop of the DC/DC converter that controls in part operation of the converter to provide constant current discharge on the primary battery side of the hybrid power supply.

3. The hybrid power supply of claim 1 wherein the switching type DC/DC boost type converter delivers an output voltage that corresponds to about 90% of the charge voltage of the rechargeable cell.

4. A method of operating a hybrid power supply comprises:
   delivering energy from a primary cell to a rechargeable cell the rechargeable cell being an Li– Ion or Li– Polymer rechargeable cell with the energy delivered through a switching type DC/DC boost type converter at a fixed voltage that is less than the full charge voltage of the rechargeable cell.

5. The method of claim 4, further comprising:
   controlling a circuit that senses primary battery current, and controls in part operation of the converter to provide a constant current discharge on the primary battery side of the hybrid power supply.

6. The method of claim 4 wherein the primary cell is an alkaline cell, Zn-air cell, fuel cell or solar cell, or another current limited power source.

7. The method of claim 4 wherein the circuit delivers an output voltage that corresponds to about 90% charge of the rechargeable cell.

8. A hybrid power supply comprises:
   a switching type DC/DC boost type converter that receives energy from a primary battery cell, with the primary battery cell being an alkaline cell, Zn-air cell, fuel cell, solar cell, or another current limited DC power source, and delivers energy to a rechargeable cell, the rechargeable battery being a Li– Ion or Li– Polymer rechargeable cell, and with the switching type DC/DC converter set to provide a fixed output voltage that is less than the full charge voltage of the rechargeable cell; and
   an operational amplifier with a primary battery current sensing resistor to provide primary battery current control with the output of the amplifier coupled in a closed feedback loop of the DC/DC converter and the closed feedback loop of the converter further comprises a resistor coupled between output and feedback terminals of the converter.

9. The hybrid power supply of claim 8, further comprising:
   a circuit including a primary battery current control that senses primary battery current, and controls in part operation of the converter to provide constant current discharge on the primary battery side of the hybrid power supply.

10. The hybrid power supply of claim 8 wherein the circuit further comprises:
    a primary current sense amplifier/comparator and a power shutdown circuit to shut down the primary current sense amplifier/comparator.

11. The hybrid power supply of claim 8 wherein the circuit delivers an output voltage that corresponds to about 90% charge of the rechargeable cell.

12. The hybrid power supply of claim 8 wherein the primary cell is an alkaline cell, Zn-air cell, or fuel cell.

13. The hybrid power supply of claim 8 wherein the primary cell is a fuel cell.

14. The hybrid power supply of claim 8 wherein the primary cell is an alkaline cell.

15. A hybrid power supply comprises:
    a switching type DC/DC boost type converter that receives energy from a primary battery cell and is arranged to deliver the energy to a rechargeable cell, the DC/DC converter having a feedback input set to provide a fixed output voltage that is less than the full charge voltage of the rechargeable cell: and a pair of external resistors coupled to the feedback input of the converter to adjust the fixed output voltage to be less than the full charge voltage of the rechargeable cell.

16. The hybrid power supply of claim 15, further comprising:

a circuit including a primary battery current control that senses primary battery current, and controls in part operation of the converter to provide constant current discharge on the primary battery side of the hybrid power supply.

17. The hybrid power supply of claim 15 wherein the circuit further comprises:

a primary current sense amplifier/comparator and a power shutdown control circuit to shut down the primary current sense amplifier/comparator.

18. The hybrid power supply of claim 15 wherein the primary battery is an alkaline cell, Zn-air cell, fuel cell, solar cell, or another current limited power source.

19. The hybrid power supply of claim 15 wherein the rechargeable battery is a Li– Ion or Li– Polymer rechargeable cell.

20. The hybrid power supply of claim 17 wherein the primary battery control comprises:

an operational amplifier with a primary battery current sensing resistor to provide primary battery current control the output of the amplifier coupled in a closed feedback loop of the converter.

21. The hybrid power supply of claim 20 wherein the closed feedback loop of the converter further comprises:

a resistor coupled between output and feedback terminals of the converter.

22. The hybrid power supply of claim 15 wherein the circuit delivers an output voltage that corresponds to about 90% charge of the rechargeable cell.

23. A hybrid power supply comprises:

a primary cell with the primary cell being an alkaline cell, Zn-air cell, fuel cell, solar cell, or another current limited DC power source;

a rechargeable cell, the rechargeable cell being an Li– Ion or Li– Polymer rechargeable cell;

a switching type DC/DC boost type converter that receives energy from the primary cell and is arranged to deliver the energy to the rechargeable cell;

a circuit disposed to control the switching type DC/DC converter to provide from the DC/DC converter a fixed output voltage that is less than the full charge voltage of the rechargeable cell in order to recharge the rechargeable cell to less that its full charge capacity.

24. The hybrid power supply of claim 23 wherein the circuit disposed to control the switching type DC/DC converter comprises:

a resistor voltage divider coupled to a feedback input of the converter, the resistor voltage divider having a resistance value selected to provide the fixed output voltage from the DC/DC converter; and a primary battery current sensor/comparator included in a feedback control loop of the DC/DC converter that controls in part operation of the converter to provide constant current discharge on the primary battery side of the hybrid power supply.

25. The hybrid power supply of claim 23 wherein the switching type DC/DC boost type converter delivers an output voltage that corresponds to about 90% charge of the rechargeable cell.

26. The hybrid power supply of claim 1 wherein the output voltage from the DC/DC converter is a fixed voltage.

* * * * *